United States Patent Office 3,442,969
Patented May 6, 1969

3,442,969
OLEFIN CONVERSION OVER GROUP V-B METAL CATALYSTS
Robert L. Banks, Bartlesville, Okla., assignor to Phillips Petroleum Company, a corporation of Delaware
No Drawing. Filed Jan. 3, 1966, Ser. No. 517,918
Int. Cl. C07c 3/34, 3/42
U.S. Cl. 260—683                                    7 Claims

ABSTRACT OF THE DISCLOSURE

An olefin is converted by contact with at least one metal of Group V–B under conditions to produce compounds having a different number of carbon atoms per molecule.

---

This invention relates to the conversion of olefin hydrocarbons. In one aspect it relates to a process for disproportionating olefin hydrocarbons to produce higher and lower molecular weight hydrocarbons by contact with a catalyst comprising vanadium, niobium or tantalum. In another aspect, it relates to a process for converting ethylene to higher olefins including propylene and butenes by contact with a catalyst comprising vanadium, niobium or tantalum.

The conversion of a specific olefin into other olefins often is desirable to produce a desired olefin from an olefin which is more readily available. The availability may relate to the relative cost of the olefins, in which case it is desirable to convert a lower cost olefin into a higher cost olefin. The availability on the other hand may relate to physical availability as, for example, in an existing process stream wherein it may be advantageous to convert the produced olefin to one for which there is an internal or external demand.

By disproportionation according to this invention is meant the conversion of a hydrocarbon into similar hydrocarbons of both higher and lower number of carbon atoms. When propylene is disproportionated, approximately equimolar quantities of ethylene and butenes are produced.

An object of this invention is the conversion of olefin hydrocarbons.

Another object of this invention is to convert olefins by disproportionation into higher and lower molecular weight olefins.

Another object of the invention is to convert ethylene into higher olefins.

Other aspects, objects and the advantages of my invention are apparent in the written description and the claims.

According to this invention, an olefin is converted by contact with a catalyst comprising at least one metal of Group V–B according to the Periodic Table in Handbook of Chemistry and Physics, 45th Ed. (1964–65), page B–2, that is, vanadium, niobium and tantalum. In general, higher conversions are obtained when the catalytic compound is supported on a relatively high surface area silica base. However, unsupported compounds are suitable.

When a catalyst of the present invention includes a silica-containing base, such base can be any suitable catalytic grade material including such materials as precipitated silica gel, micro-spheroidal silica, flame-hydrolyzed silica, and aerogel silica. These materials have appreciable surface area, usually in the range of 50–700 square meters per gram, and can range from fine powders to coarse granules, and often contain small amounts of compounds of aluminum and of sodium, in the order of a few tenths percent by weight and smaller. Trace amounts of other metals, in such small amounts of these materials which do not affect the basic characteristics of the reaction, are acceptable.

Silica-alumina bases are known to have catalytic activity for various hydrocarbon reactions, such as cracking and polymerization. These reactions can be avoided in the present process by maintaining the alumina content below about 1 percent by weight, preferably below about one-half percent. Bases having larger amounts of alumina can be utilized but conditions must be selected to avoid undesired reactions. Such reactions can be avoided by using suitably low reaction temperatures and avoiding excessively long contact times. By careful selection of conditions, high conversion and high efficiency for the desired reaction can be obtained with a relatively high proportion of alumina in the base, for example, bases such as silica-aluminas which are conventional cracking or polymerization catalysts, and even with bases with larger proportions of alumina, including compositions which are preponderantly alumina.

The catalysts of this invention can contain other materials which do not substantially promote unwanted reactions. For example, the base can contain substantial amounts of titanium oxide or other materials in amounts which do not change the essential characteristics of this reaction.

The supported catalysts of the invention can be prepared by incorporating a Group V–B metal component with a silica base in any suitable manner, such as by conventional methods including dry mixing, coprecipitation or impregnation. The form of the finished catalyst, containing both the Group V–B metal compounds, for example, and the silica, can also range widely. Fine powders, granules, agglomerates, pellets, spheres, extrudates, and the like, can be prepared and utilized depending upon the contacting technique of the hydrocarbon conversion. Compounds which are suitable for the preparation of the catalyst include oxides, compounds convertible to the oxides on calcination, and other compounds such as, for example, sulfates of these metals. Such a catalyst contains from about 0.05 to about 20, preferably from about 1.0 to about 10 weight percent, of the Group V–B compound, calculated as the metal, based on the total catalyst. Sufficient promoter is used to obtain the desired activity, and unnecessarily large amounts ordinarily are not used. More than one Group V–B metal compound can be utilized in a single catalyst.

After the Group V–B metal compound is associated with the silica base in accordance with the above description, the composite mixture can be subjected to a heat treatment to increase the activity of the catalyst. Similarly when an unsupported Group V–B metal compound is used as the catalyst, a suitable heat treatment can be used. In either instance, the activating treatment is carried out in oxidizing atmosphere at a temperature in the range of from about 600 to about 1600° F., preferably from about 700 to about 1500° F. The time of activation can vary over a broad range, depending upon the temperature employed. Generally the period of activation is at least 30 minutes and preferably from about 2 to 10 up to 24 hours. The gas with which the catalyst is contacted during activation contains oxygen and is substantially free of water. If desired, the oxidizing atmosphere activation treatment can be followed by a similar treatment with carbon monoxide and/or hydrogen also at elevated temperatures.

The feed olefins applicable to the invention are acyclic olefins having 2 to about 20 carbon atoms per molecule or mixture thereof. These can be branched or unbranched. Such acyclic olefins molecules can, however, contain aromatic and cycloparaffinic substituents. Some examples of suitable olefin feeds are ethylene, propylene, isobutene, butene-1, 3,3-dimethylbuetne-1, pentene-2, hexene-2, 4-methyl-5-ethyloctene-2, dodecene-1, tetradecene-4, eicosene-1, allylbenzene, 4-benzylhexene-2, 3-cyclohexyl-4-methylheptene-1, octene-3, heptene-2 and nonene-4. The process is most valuable for unbranched monoolefins, particularly non-symmetrical olefins having up to about 9 carbon atoms per molecule and the conversion of ethylene and propylene is particularly advantageous.

The olefin and catalysts are contacted either batchwise or continuously using a stirred batch reactor, fixed or mobile catalyst bed, fluidized catalyst chamber, ebulated bed or other suitable contacting technique. Preferably, the process is carried out in vapor phase at temperatures from about 400 to about 1200° F. and at pressures of about 0 to about 1500 p.s.i.g. With supported catalysts, the temperature is preferably in the range of 800 to about 1000° F. and the pressure preferably is in the range of 200 to about 600 p.s.i.g. On the other hand, with unsupported Group V–B compound catalysts, particularly with unsupported tantalum oxide, the preferred temperature range is 900–1100° F. In some instances, sub-atmospheric pressures can be employed. In continuous operations, gaseous space velocities in the range of 100 to about 10,000 vol. gas/vol. cat./hr. are used. If desired, a suitable diluent can be employed such as paraffinic and/or cycloparaffinic hydrocarbons having up to 12 carbon atoms per molecule as well as mixtures of these and similar materials.

Following the reaction period, suitable methods are used to separate the hydrocarbon phase from the solid catalytic phase and to recover the desired products. Techniques such as fractional distillation, solvent extraction, adsorption, etc., can be employed for the separation of the products. Unconverted feed materials, diluents, or products not in the desired molecular range can be recycled. The invention is further illustrated by the following examples.

Example I

A catalyst was prepared by impregnating 20 parts by weight of a catalytic grade silica gel (surface area 374 square meters per gram, pore diameter 25 angstroms, 20–40 mesh) with a vanadyl sulfate solution prepared by dissolving 0.80 part by weight of $VOSO_4 \cdot 2H_2O$ in a solution made by mixing 8.5 parts by weight of 70 percent nitric acid and 12 parts by weight of water. The mixture was slurried well and dried. The dried material was activated in flowing air in a glass activation tube at 1000° F. for 5.5 hours. It was cooled in flowing nitrogen gas. The finished catalyst contained about 1 percent vanadium, calculated as the metal.

A quantity of this catalyst was charged as a bed into a stainless steel fixed bed reactor. Using ethylene as the feed gas, contact was made with the catalyst bed under several conditions of temperature, pressure, and space velocity. During the runs, the gaseous effluent was chromatographically analyzed to determine the conversion, efficiency and identification of products. The results of this series of runs are presented in the following table.

Example II

In other runs in which the procedure employed was similar to that described in Example I, propylene was subjected to the vanadium containing catalytic bed. The reaction pressure in these runs was 200 p.s.i.g. The results of this conversion of propylene are seen in the following table:

| | | | | | |
|---|---|---|---|---|---|
| Temp., °F | 610 | 820 | 935 | 935 | 1,035 |
| GHSV, v./v./hr | 2,000 | 2,000 | 2,000 | 1,000 | 1,000 |
| Time, min | 14 | 49 | 93 | 141 | 254 |
| Effluent, wt. percent: | | | | | |
| Methane, hydrogen | | 0.1 | 0.4 | 0.4 | 0.2 |
| Ethylene, ethane | | 0.1 | 0.8 | 0.8 | 2.2 |
| Propane | 0.6 | 3.6 | 7.6 | 6.6 | 1.7 |
| Propylene | 99.4 | 96.0 | 82.0 | 84.0 | 88.8 |
| N-Butane, isobutane | | | 0.1 | 0.1 | 0.1 |
| 1-butene | | | 0.5 | 0.4 | 0.3 |
| Trans-2-butene | | 0.2 | 0.3 | 0.3 | 1.3 |
| Cis-2-butene | | | 0.2 | 0.2 | 1.2 |
| Butadiene | | | | t | 0.1 |
| $C_5+$ | | | 8.1 | 7.2 | 4.1 |
| Propylene conversion, percent | 4.0 | 18.0 | 16.0 | 11.2 | |
| Eff. to ethylene and butenes, percent | 8 | 11 | 11 | 44 | |

These data show that the process is capable of converting propylene to products of higher and lower molecular weight.

Example III

Tantalum oxide ($Ta_2O_5$) in the form of a fine powder was slurried with water, dried, and the resulting agglomerated cake was broken up to form particles having a 20–40 mesh size. A quantity of these particles was charged as a fixed bed into a glass reactor. The catalyst bed was activated in place by heating to 1000° F. and passing a flowing stream of dry air through it for four hours. The stream of flowing air was then replaced by a stream of flowing nitrogen and the catalyst was cooled to 200° F. before use in the process.

The reaction tube and catalyst bed were heated to 1000° F., and a flow of propylene was admitted at a space rate of 10 vol./vol./min. and at a pressure of one atmosphere. After 2½ hours on stream, the reactor effluent was sampled and subjected to gas-liquid chromatographic analysis. The results, in weight percent, are shown in the following table:

| | Percent |
|---|---|
| $N_2$[1] or $H_2$ | 3.1 |
| Ethylene | 3.1 |
| Propylene | 91.7 |
| n-Butane | 0.2 |
| 1-butene | 0.6 |
| Trans-2-butene | 0.5 |
| Cis-2-butene | 0.4 |
| Butadiene | 0.2 |

[1] Contained some unavoidable air from the sampling process used.

The data above show that the propylene conversion was about 8.3 percent. Some propylene was disproportionated and the efficiency of the conversion to ethylene

| | | | | | | | |
|---|---|---|---|---|---|---|---|
| Temp., °F | 715 | 835 | 1200+ | 850 | 905 | 855 | 855 |
| Pressure, p.s.i.g | 410 | 410 | 410 | 410 | 200 | 210 | 210 |
| GHSV, v./v./hr | 2,500 | 2,500 | 2,500 | 2,500 | 1,500 | 1,500 | 1,500 |
| Time, min | 29 | 48 | 56 | 65 | 85 | 120 | 246 |
| Effluent, wt. percent | | | | | | | |
| Methane, hydrogen | 5.1 | 7.9 | 27.3 | 1.9 | 1.6 | 1.9 | 2.0 |
| Ethylene, ethane | 94.5 | 86.8 | 53.9 | 92.4 | 91.4 | 94.1 | 94.0 |
| Propane | | 0.1 | 9.8 | 0.1 | 0.2 | | 0.1 |
| Propylene | | 0.4 | 1.9 | 0.6 | 2.4 | 0.6 | 0.6 |
| Isobutane | | 0.6 | 0.5 | 0.1 | | | |
| n-Butane | 0.1 | 0.8 | 3.5 | 0.7 | 0.4 | 0.2 | 0.2 |
| 1-butene | 0.1 | 1.0 | 0.8 | 1.3 | 1.3 | 1.0 | 1.1 |
| Trans-2-butene | 0.1 | 1.3 | 0.9 | 1.5 | 1.5 | 1.2 | 1.0 |
| Cis-2-butene | 0.1 | 1.0 | 0.7 | 1.1 | 1.1 | 0.9 | 0.8 |
| $C_5+$ | | 0.1 | 0.7 | 0.2 | 0.2 | 0.2 | 0.2 |
| Ethylene conversion, percent | 5.5 | 13.2 | 46.1 | 7.6 | 8.6 | 5.9 | 6.0 |
| Eff. to propylene and butenes, percent | 5 | 30 | 10 | 60 | 75 | 65 | 60 |

The data in the table above show that the process is capable of converting ethylene to other products, including olefinic products, over a wide range of operating conditions.

and butenes was about 56 percent. After completion of the run, the catalyst bed was examined for carbon deposits and carbon, in an amount corresponding to 0.95 weight percent of the weight of the catalyst, was found.

After use in the process, the catalyst had a surface area of 1 m.²/g.

Example IV

Using the same reactor and the same general procedure as that of Example III, propylene was converted over a niobium oxide/silica catalyst which contained about 10 weight percent niobium oxide. The catalyst was prepared by ball-milling $Nb_2O_5$ and silica together for four hours. The powder was then pelleted, crushed, and screened to 20–40 mesh particles. The catalyst was activated for 4 hours at 1000° F. before use.

Propylene was passed through the activated catalyst bed within the reactor at atmospheric pressure, at a gaseous hourly spaced rate of 600 v./v./hr., and at a temperature of 1000° F. After 2 hours on stream, the effluent analysis, in weight percent, was as follows:

| | Percent |
|---|---|
| Ethylene | 2.1 |
| Propylene | 96.3 |
| 1-butene | 0.5 |
| Trans-2-butene | 0.5 |
| Cis-2-butene | 0.3 |
| Butadiene | 0.3 |

The conversion of propylene was 3.7 percent while the efficiency to ethylene and butenes was about 90 percent.

Example V

Propylene was converted over a tantalum oxide/silica catalyst containing about 10 weight percent tantalum oxide. The catalyst was prepared and activated as in Example IV from a mixture of $Ta_2O_5$ and silica.

A 20 volume percent mixture of propylene in propane was passed through a bed of this catalyst at 450 p.s.i.g., at a gaseous hourly space velocity of 5250 v./v./hr., and at a temperature of 1000° F. After 75 minutes on stream, the effluent from the reactor had the following analysis, by weight:

| | Percent |
|---|---|
| $H_2$ and/or $N_2$ | 0.2 |
| Ethylene | 1.6 |
| Propane | 40.7 |
| Propylene | 48.7 |
| n-Butane | 0.2 |
| 1-butene | 0.5 |
| Trans-2-butene | 1.1 |
| Cis-2-butene | 1.0 |
| Isopentane | 0.2 |
| $C_5$ and heavier | 5.8 |

The propylene conversion was 18 percent while the efficiency to ethylene and butenes was about 40 percent.

Reasonable variation and modification are possible within the scope of the invention which sets forth a process for the conversion of olefins utilizing a catalyst comprising a Group V–B metal.

I claim:
1. A process which comprises converting an acyclic olefin having 2 to about 20 carbon atoms per molecule by contacting at least one said olefin at a temperature in the range of 400–1200° F. and at a pressure in the range of 0 to about 1500 p.s.i.g. with a catalyst selected from the group consisting of unsupported tantalum oxide and compounds of vanadium, niobium and tantalum supported on a silica containing base having a surface area of at least 50 square meters per gram wherein the amount of any alumina in said base is less than a preponderant amount.

2. The process of claim 1 wherein said catalyst comprises a compound of vanadium, niobium or tantalum supported on silica and said temperature is in the range of 800–1000° F. and said pressure is in the range of 200 to about 600 p.s.i.g.

3. The process of claim 2 wherein said olefin is an unbranched mono-1-olefin.

4. The process of claim 3 wherein said olefin is ethylene and is converted to higher olefins including propylene and butene.

5. The process of claim 1 wherein said olefin has 3–8 carbon atoms per molecule and is disproportionated to higher and lower molecular weight olefins.

6. The process of claim 1 wherein said catalyst is unsupported tantalum oxide and the contact of said olefin with said catalyst is at a temperature in the range of 900–1100° F 7. The process of claim 2 wherein said base contains less than about 1 percent by weight of alumina.

References Cited

UNITED STATES PATENTS

| | | | |
|---|---|---|---|
| 2,178,602 | 11/1939 | Morrell et al. | 260—680 |
| 2,785,209 | 3/1957 | Schmetterling et al. | 260—683 |
| 3,261,879 | 7/1966 | Banks | 260—683 |

DELBERT E. GANTZ, *Primary Examiner.*

C. E. SPRESSER, *Assistant Examiner.*

U.S. Cl. X.R.

260—666, 668, 677